United States Patent Office 3,787,420
Patented Jan. 22, 1974

3,787,420
CYANOALKOXY (TRIFLUOROMETHYL) PYRIDINES
Florence E. Torba, Clayton, Calif., assignor to The Dow Chemical Company, Midland, Mich.
No Drawing. Application Mar. 17, 1969, Ser. No. 77,736, now Patent No. 3,705,170, which is a division of application Ser. No. 807,980, Mar. 17, 1969, now Patent No. 3,609,158. Divided and this application July 14, 1972, Ser. No. 272,017
Int. Cl. C07d 39/28
U.S. Cl. 260—294.9                  2 Claims

ABSTRACT OF THE DISCLOSURE

Disclosed as novel compounds are (trifluoromethyl) pyridine derivatives which are substituted by a hydroxy, mercapto, alkoxy, loweralkenoxy, aryloxy, alkylthio, alkylsulfonyl, arylsulfonyl, amino, hydrazino or oxyloweralkanoic acid or acid derivative group and optionally by chlorine and/or fluorine. Any remaining positions on the pyridine ring are taken up by hydrogen. The compounds have utility as herbicides and as active constituents of various miticidal, anthelmintic, fungicidal and bacteriocidal compositions.

CROSS REFERENCE TO RELATED APPLICATION

This application is a division of my co-pending application Ser. No. 77,736, filed Mar. 17, 1969, now U.S. Pat. 3,705,170, which is in turn a division of application Ser. No. 807,980, filed Mar. 17, 1969, now U.S. Pat. 3,609,158.

Certain of the mono- and polychloro-(trifluoromethyl) pyridines employed as starting materials in preparing the compounds of the present invention form the subject matter of copending application, Ser. No. 749,977, filed Aug. 5, 1968, by Florence E. Torba.

SUMMARY OF THE INVENTION

The novel compounds of the present invention are substituted (trifluoromethyl)pyridines of the formula

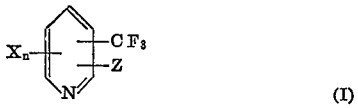

(I)

wherein X represents chlorine or fluorine, $n$ is an integer having a value of 0, 1, 2 or 3, and Z is a radical selected from the group consisting of hydroxy, mercapto, amino, alkylamino, hydrazino, alkylhydrazino, alkylsulfonyl, arylsulfonyl, alkoxy, loweralkenoxy, aryloxy, alkylthio, arythio, oxyloweralkanoic acid and the nitrile, salt, alkyl ester, amide, alkylamide, hydrazide and alkylhydrazide derivative radicals of said oxyloweralkanoic acid radicals. As employed herein, "alkyl," along with its equivalent derivative expressions, designates an alkyl group containing 1, 2, 3, 4 etc. and up to and including 12 carbon atoms, and from 1 to 2, to 3, to 4 etc. and up to and including 12 carbon atoms such as methyl, ethyl, propyl, isopropyl, butyl, isobutyl, sec.-butyl, pentyl, hexyl, heptyl, octyl, 2-ethylhexyl, nonyl, decyl, 4-methyldecyl, undecyl and dodecyl; "loweralkenyl," along with its equivalent derivative expressions, designates alkenyl groups containing 2, 3 or 4 carbon atoms and from 2 to 3, to 4 carbon atoms such as vinyl, allyl, methallyl or crotyl; and "loweralkanoic acid" designates alkanoic acids containing 2, 3 or 4 carbon atoms, and from 2, to 3, to 4 carbon atoms, inclusive, such as acetic acid, propionic acid, butyric acid an disobutyric acid. Suitable aryl groups include monocyclic phenyl radicals containing from 1 to 5 substituents on a phenyl ring, said substituents being selected from the group consisting of hydrogen, alkyl, phenyl, chloro and nitro. Typical aryl groups include phenyl, o-, m- and p-tolyl, p-chlorophenyl, o-, m- and p-ethylphenyl, p-n-hexylphenyl, p-dodecylphenyl, pentachlorophenyl, 2,4-dichlorophenyl, p-nitrophenyl, 2 - chloro-4-nitrophenyl, 4-nitrophenyl, 4-chloro-2-phenylphenyl and the like. For convenience of description, the compounds coming within the scope of the above formula, as defined herein, are referred to in the specification and claims as "substituted (trifluoromethyl)pyridine" compounds or simply as "substituted" compounds.

The novel compounds of this invention are white to yellow waxy or crystalline solids or yellow or colorless oils having very slight to moderate solubility in water and moderate to good solubility in conventional organic solvents such as acetone, benzene, dichloromethane, carbon tetrachloride, ethanol and isopropanol. Said novel compounds have utility in a wide variety of agricultural applications. Thus, they are useful in agronomical practices for the control of weeds as well as other plants. They are also useful as fungicides, bacteriocides and parasiticides and are adapted to be employed as active constituents of various nematocide, miticide, insecticide and anthelmintic compositions.

Representative novel compounds coming within the scope of the present invention include the following:

6-(trifluoromethyl)-2-pyridinol
6-chloro-4-(trifluoromethyl)-2-pyridinol
3,5-dichloro-2-(trifluoromethyl)-4-pyridinol
2,3,5-trichloro-6-trifluoromethyl)-4-pyridinol
3,5-dichloro-6-(trifluoromethyl)-2-pyridinol
2,3,5-trichloro-6-(trifluoromethyl)-4-pyridinethiol
3,5-dichloro-4-methylthio-2-(trifluoromethyl)pyridine
3,5-dichloro-4-n-hexylthio-2-(trifluoromethyl)pyridine
3,5-dichloro-4-((p-chlorophenyl)thio)-2-(trifluoromethyl)pyridine
3,5-dichloro-4-(methylsulfonyl)-2-(trifluoromethyl)pyridine
3,5-dichloro-4-((2-ethylhexyl)sulfonyl)-2-(trifluoromethyl)pyridine
3,5-dichloro-4-((p-chlorophenyl)sulfonyl)-2-(trifluoromethyl)pyridine
3,5-dichloro-4-((p-tolyl)sulfonyl)-2-(trifluoromethyl)pyridine
3,5-dichloro-4-((p-nitrophenyl)sulfonyl)-2-(trifluoromethyl)pyridine
3,5-dichloro-4-methoxy-2-(trifluoromethyl)pyridine
2,3,5-trichloro-4-methoxy-6-(trifluoromethyl)pyridine
2,3,5-trichloro-4-isopropoxy-6-(trifluoromethyl)pyridine
2-methoxy-6-(trifluoromethyl)pyridine
2-((2-ethylhexyl)oxy)-6-(trifluoromethyl)pyridine
2-allyloxy-6-(trifluoromethyl)pyridine
2-(dodecyloxy)-6-(trifluoromethyl)pyridine
2-((3,4-dichlorophenyl)oxy)-6-(trifluoromethyl)pyridine
3,5-dichloro-2-((3,4-dichlorophenyl)oxy)-6-trifluoromethyl)pyridine
3,5-dichloro-2-((4-chloro-2-phenylphenyl)oxy)-6-(trifluoromethyl)pyridine
3,5-dichloro-2-fluoro-6-(trifluoromethyl)-4-pyridinol
2-fluoro-6-(trifluoromethyl)-4-pyridinol
3,5-dichloro-2-fluoro-4-amino-6-(trifluoromethyl)pyridine
2-fluoro-4-amino-6-(trifluoromethyl)pyridine
((2-fluoro-6-(trifluoromethyl)-4-pyridyl)oxy)acetic acid
((3,5-dichloro-2-fluoro-6-(trifluoromethyl)-4-pyridyl)oxy)acetamide
((3,5-dichloro-2-fluoro-6-(trifluoromethyl)-4-pyridyl)oxy)acetic acid
((3,5-dichloro-2-fluoro-6-(trifluoromethyl)-4-pyridyl)oxy)-acetic acid ethyl ester
2-chloro-4-amino-6-trifluoromethyl)pyridine 2-chloro-4-(trifluoromethyl)-6-aminopyridine
2-amino-6-(trifluoromethyl)pyridine
3,5-dichloro-4-amino-2-(trifluoromethyl)pyridine
3,5-dichloro-4-hydrazino-2-(trifluoromethyl)pyridine
3,5-dichloro-4-(ethylhydrazino)-2-(trifluoromethyl)pyridine
3,5-dichloro-4-(1,1-dimethylhydrazino)-2-trifluoromethyl)pyridine
3,5-dichloro-4-butylamino-2-(trifluoromethyl)pyridine
2,3,5-trichloro-4-(isopropylamino)-6-(trifluoromethyl)pyridine
3,5-dichloro-4-(dipropylamino)-2-(trifluoromethyl)pyridine
((6-(trifluoromethyl)-2-pyridyl)oxy)acetic acid methyl ester
((6-(trifluoromethyl)-2-pyridyl)oxy)acetic acid ethyl ester
((6-(trifluoromethyl)-2-pyridyl)oxy)acetic acid-2-ethylhexyl ester
((3,5-dichloro-6-(trifluoromethyl)-2-pyridyl)oxy)acetic acid ethyl ester
((3,5-dichloro-6-(trifluoromethyl)-2-pyridyl)oxy)acetic acid dodecyl ester
((6-trifluoromethyl)-2-pyridyl)oxy)acetic acid isobutyl ester
((6-(trifluoromethyl)-2-pyridyl)oxy)methylacetic acid ethyl ester
((6-(trifluoromethyl)-2-pyridyl)oxy)acetic acid
((6-(trifluoromethyl)-2-pyridyl)oxy)methylacetic acid
((6-(trifluoromethyl)-2-pyridyl)oxy)butyric acid
((3,5-dichloro-6-(trifluoromethyl)-2-pyridyl)oxy)acetic acid
((6-(trifluoromethyl)-2-pyridyl)oxy)acetamide
((N-ethyl-(trifluoromethyl)-2-pyridyl)oxy)acetamide
((6-(trifluoromethyl)-2-pyridyl)oxy)-N,N-dimethylacetamide
((6-(trifluoromethyl)-2-pyridyl)oxy)-N-ethylacetamide
((6-(trifluoromethyl)-2-pyridyl)oxy)acetonitrile
((6-(trifluoromethyl)-2-pyridyl)oxy)acetohydrazide
((6-(trifluoromethyl)-2-pyridyl)oxy)aceto-ethylhydrazide
((6-(trifluoromethyl)-2-pyridyl)oxy)aceto-(1,1-dimethyl)hydrazide
sodium salt of ((6-trifluoromethyl)-2-pyridyl)oxy)acetic acid
potassium salt of ((6-(trifluoromethyl)-2-pyridyl)oxy)acetic acid
ammonium salt of ((3,5-dichloro-6-(trifluoromethyl)-2-pyridyl)oxy)acetic acid
sodium salt of ((6-(trifluoromethyl)-2-pyridyl)oxy)methylacetic acid The substituted (trifluoromethyl)pyridine compounds of the present invention can be prepared by intimately contacting and causing to react the appropriate reagent, or series of reagents, with a halo-(trifluoromethyl)pyridine compound having the formula

(II)

wherein X and $n$ are as defined above. A halo-containing by-product is also formed during the reaction as halogen is removed from the pyridine ring.

The substituted compounds of the present invention wherein Z is a hydroxy group can be prepared by reacting an appropriate halo-(trifluoromethyl)pyridine Compound II with aqueous sodium hydroxide, thereby forming the desired hydroxy-(trifluoromethyl)pyridine product along with sodium chloride or sodium fluoride as by-product. The reaction can be conducted by stirring together and heating the pyridine reactant with aqueous sodium hydroxide in a solvent such, for example, as ethanol or dimethyl sulfoxide. The caustic reactant is ordinarily employed in excess, and the reaction proceeds readily as the solution is refluxed for periods of ½ to 2 or more hours. The reaction mixture so obtained is poured into water and then acidified to precipitate the desired hydroxy (trifluoromethyl)pyridine compound which can then be filtered off and purified by conventional washing and other methods known to the skilled in the art.

The substituted compounds of the invention wherein Z is a mercapto group can be prepared by reacting the appropriate halo-(trifluoromethyl)pyridine compound with sodium sulfide to form the desired product compound and sodium chloride or sodium fluoride as a by-product. The reaction can be conducted by adding the halo-(trifluoromethyl)pyridine compound to a refluxing slurry of the sodium sulfide in a lower alcohol solvent such as isopropanol or the like. The reaction proceeds readily as the stirred reaction mixture is refluxed for ½ to 4 or more hours. The reactants can be employed in substantially equimolar amounts, and preferably with a slight excess of the sodium sulfide. The resulting product mixture is usually poured into water and then acidified to precipitate the desired mercapto-(trifluoromethyl)pyridine compound which can be filtered off and further purified as by conventional washing and solvent recrystallization methods, if desired.

The substituted (trifluoromethyl)pyridine compounds of this invention wherein Z is an amino group, an alkylamino group or a hydrazino or alkylhydrazino group can be prepared by reacting the appropriate halo-(trifluoromethyl)pyridine starting Compound II with ammonia to form the amino group, with a primary or secondary alkylamine to form the alkylamino groups, or with hydrazine or an alkylhydrazine to form hydrazino or alkylhydrazino groups. The reactants are customarily employed using approximately two moles of ammonia or of the amine or hydrazine reactant for each mole of the pyridine reactant. The hydrogen chloride or hydrogen fluoride by-product formed during the reaction is taken up by the excess of the non-pyridine reactant, these compounds combining to form a salt. When using ammonia or a gaseous or other low boiling amine, the reaction may be carried out at temperatures of about 75° to 150° C. in a pressure vessel at autogenous pressures for about ½ to 4 or more hours. In an alternative method, gaseous ammonia or amine is bubbled through a solution of the pyridine reactant in a solvent such as isopropanol or dimethyl sulfoxide for ½ to 10 or more hours as the reaction mixture is maintained at from about 60° to 135° C., or at reflux. With other amines, or with a hydrazine, the reaction is carried out by mixing and stirring the reactants together in a solvent such as toluene, dimethyl formamide or isopropanol at temperatures of from about 60° to 150° C., or at reflux, for periods of from ½ to 24 hours or more. At the end of the reaction, the desired substituted (trifluoromethyl)pyridine compound can be recovered and purified according to conventional procedures. For example, the salt formed during the reaction can be filtered off when present as a solid, or the reaction mixture can be washed with water to remove said salt. The desired product can then be further purified by recrystallization from a solvent, if desired. Suitable amines and hydrazines which can be employed in the foregoing reaction include: methylamine, ethylamine, n-propylamine, isobutylamine, sec.-butylamine, sec.-amylamine, 2-methyl-n-butylamine, n-hexylamine, 3-amino-n-hexane, 4-amino-n-heptane, n-nonylamine, n-octylamine, decylamine, undecylamine, dodecylamine, dimethylamine, diethylamine, diisopropylamine, di-n-butylamine, ethylmethylamine, diisoamylamine, dioctylamine, methylisopropylamine, N-methyldecylamine, ethylpropylamine, di-n-heptylamine, hydrazine, methylhydrazine, ethylhydrazine isopropylhydrazine, 2-ethylhexylhydrazine, 1,1-dimethylhydrazine, 1,1-diethylhydrazine and 1,2-dimethylhydrazine.

The ether compounds of this invention wherein Z is alkoxy, loweralkenoxy, aryloxy, alkylthio or arylthio can be prepared by reacting the appropriate halo-(trifluoromethyl)pyridine Compound II with an alkanol, loweralkenol, phenol, mercaptan or thiophenol which will supply a predetermined Z group. Suitable alkanols include, for example, methyl alcohol, ethyl alcohol, butyl alcohol, amyl alcohol, 3,7-dimethyloctanol-1, sec.-hexyl alcohol, nonyl alcohol, n-undecyl alcohol, n-dodecanol, 2,3-dimethylpentanol-3, secondary-amyl alcohol, 5-methylhexanol-1, methylnonyl carbinol, 2-ethylhexanol, 5-ethyl-2-nonanol and cetyl methylcarbinol. Illustrative suitable loweralkenols are allyl alcohol, crotyl alcohol and 2-methylallyl alcohol. Suitable phenols include, for example, phenol, o-ethylphenol, m-ethyl phenol, 4-methyl-5-ethylphenol, 2-methyl-4-ethylphenol, p-cresol, 3,5-dimethylphenol, 2,5-dimethylphenol, 2,4-diethylphenol, 3,5-diethylphenol, thymol, carvacrol, p-tertiary-butylphenol, m-secondary-butylphenol, p-secondary-amylphenol, p-normal-hexylphenol, p-tertiary-octylphenol, 2,5-dimethyl-6-ethylphenol, p-decylphenol, pentachlorophenol, 2,4-dichlorophenol, p-chlorophenol, p-phenylphenol, 2-chloro-4-phenylphenol, 2,3,4-trichlorophenol, 2,3,5,6-tetrachlorophenol, 2,3,5,6-tetrachloro-o-cresol, 4-chloro-2-phenylphenol, p-nitrophenol, 2-nitro-p-cresol, 2-chloro-4-nitrophenol, 6-chlorothymol, p-chloro-m-xylenol, p-isopropylphenol, nitrotertiary-butyl-o-cresol, 2-secondary-butyl-4,6-dinitrophenol, 4,6-dichloro-o-cresol, 2-isopropyl-4,6-dinitrophenol, 2-hexyl-4,6-dinitrophenol, 2,4-dinitro-6-phenylphenol, 2,4-dichloro-symmetrical-3,5-xylen-1-ol, 2,5-diisopropylphenol, 3,5-dinitrophenol, 2,3,5,6-tetramethylphenol, 2,4,6-trichloro-m-cresol and 2,3,5-trimethylphenol. Suitable mercaptans are represented by lauryl mercaptan, hexyl mercaptan, ethyl mercaptan, heptyl mercaptan, methyl mercaptan and butyl mercaptan. Suitable thiophenols include, for example, benzenethiol, p-tertiary-butylbenzenethiol, 2,6-diethylbenzenethiol, 2,4,6-trisisopropylbenzenethiol, 2,4,6-trinitrobenzenethiol, 2,4,6-trimethylbenzenethiol, 4-biphenylthiol, 2,4,5-trichlorobenzenethiol, pentachlorobenzenethiol, 4-nitrobenzenethiol, 4-chlorobenzenethiol, 2,4-dichlorobenzenethiol, m-toluenethiol, 3,4-dichlorobenzenethiol, 2,5-dichlorobenzenethiol, 2,4-dinitrobenzenethiol and o-ethylbenzenethiol.

In carrying out the reaction which is formative of the ether compounds hereof, the appropriate halo-(trifluoromethyl)pyridine compound is reacted with a solution of an equivalent amount of the sodium salt of the appropriate hydroxy or thiol compound at temperatures of from about 60° to about 120° C. for from about 0.5 to 15 hours. Suitable solvents or diluents for carrying out the reaction include alcohols or mercaptans corresponding to the ether prepared, lower alcohols such as ethanol or isopropanol, tetrahydrofuran, etc. The reaction is conveniently carried out at the reflux temperature of the reaction mixture. As a result of these operations, a reaction takes place with the formation of the desired (trifluoromethyl)pyridine ether compound and sodium chloride or sodium fluoride as a by-product. The reaction mixture can be filtered to remove the insoluble sodium salt and the filtrate washed with water and extracted with a hydrocarbon solvent such as pentane or hexane. The extract is then stripped of solvent under reduced pressure, leaving the desired (trifluoromethyl)pyridine ether compound as residue. Alternatively, the reaction mixture may be heated to distill off most of the solvent and the residue diluted with water to dissolve the sodium salt by-product and to precipitate the desired product which may then be recovered by solvent extraction or otherwise.

The sulfonyl compounds of this invention wherein Z is an alkylsulfonyl or an arylsulfonyl group can be prepared by the oxidation of the corresponding ether compounds, as described above, wherein Z is an alkylthio or an arylthio group. Representative oxidizing agents which can be employed for this purpose include fuming nitric acid, nitric acid, hydrogen peroxide, potassium permanganate and chromate-sulfuric acid (a mixture of alkali metal chromate and sulfuric acid). This oxidation reaction consumes two atoms of oxygen for each molecule of the ether compound to be oxidized, and each molecule of the aforesaid oxidizing agents yields one atom of oxygen to be consumed during the reaction. Thus, the reactants are employed in a ratio of at least two moles of the oxidizing agent for each mole of the ether compound, and preferably the oxidizing agent is used in excess. However, here as with the other preparations described herein, the use of the reactants in any particular proportion is not critical, some of the desired product being formed upon combining the reactants in any proportions. When employing hydrogen peroxide and conveniently an aqueous solution thereof as the oxidizing agent, the reaction is carried out in the presence of a liquid reaction medium such as acetone, glacial acetic acid, trifluoroacetic acid or a mixture of acetic acid and acetic anhydride.

The foregoing oxidation reaction takes place at temperatures of from about 75° C. to about 120° C., and conveniently the reaction is carried out under reflux conditions. The reaction mixture is maintained at a temperature within the foregoing range for a short period of time such as about ½ to 2 hours. Following the reaction, the desired sulfonyl-substituted (trifluoromethyl)pyridine product can be separated by conventional procedures such as evaporation of the reaction medium to obtain the product as a solid residue. In an alternative procedure, the reaction mixture is washed with cold water and is thereafter filtered to obtain the crystalline product. In employing nitric acid or fuming nitric acid as the oxidizing agent, the reaction can be carried out in the presence of a reaction medium such as carbon tetrachloride, methylene dichloride, ethylene dibromide, or the like. An excess of the oxidizing agent is preferably employed, and the reaction proceeds rapidly at temperatures between about 15° and 120° C. Preferably the reaction is carried out at temperatures of from 80° to 120° C. and requires only a short period of time for completion. Following the reaction, the desired product can be separated and recovered in accordance with the methods previously described. In still another procedure, potassium permanganate or a chromate-sulfuric acid mixture, and conveniently the chromate as the potassium or sodium salt, can be employed as the oxidizing agent. Here the oxidation is carried out in the presence of a liquid medium such as water and at temperatures of from about 10° to 70° C. When using potassium permanganate, the pH of the medium is maintained at a value below 7 by the addition of a mineral acid.

The compounds of the present invention wherein Z is an oxyloweralkanoic acid group or an alkylester derivative thereof can be prepared from (trifluoromethylpyridine compounds which are substituted by a hydroxy group. In carrying out this preparation, the hydroxy derivative, prepared as described above, is first converted to the corresponding sodium alcoholate. This can be effected by reacting the hydroxy compound with at least an equivalent amount of sodium in an ethanol solvent, the reaction proceeding as the mixture is refluxed for a period of ½ to 2 hours. To the resulting solution is then added an equivalent amount of a bromoloweralkanoic acid alkyl ester (e.g., $BrCH_2COOC_2H_5$). In the ensuing metathetical reaction, which takes place in a matter of 1 to 10 hours under reflux conditions, there is formed a compound of the present invention wherein Z is an alkyl ester of an oxyloweralkanoic acid group (e.g., $-OCH_2COOC_2H_5$). This ester derivative can be recovered and purified according to conventional procedures. For example, the salt can be filtered off and the solvent evaporated, leaving a product from which the ester can be extracted with hexane, benzene or other solvent. The ester is then recovered in relatively pure form as the solvent is stripped off. The corresponding free acid derivative (e.g., wherein Z is $-OCH_2COOH$) can then be formed by hydrolysis of the ester. This may be accomplished by dissolving the ester in an alcoholic solvent and adding a dilute base such as aqueous caustic. The reaction proceeds readily at temperatures of 40° to 70° C., or at reflux, and is complete in about ¼ to 2 hours. Thereafter, the mixture is cooled, diluted with water and acidified to precipitate the desired free acid compound which can then be recovered and purified according to conventional procedures.

The compounds of the present invention wherein Z is an amide or a hydrazide derivative of an oxyloweralkanoic acid group can be prepared by reacting an appropriate loweralkyl ester of the corresponding (trifluoromethyl)pyridine compound, as substituted with an oxyloweralkanoic acid radical with an appropriate nitrogen base. Thus the amides can be prepared by reacting the ester with ammonia, while the alkylamides can be prepared by reacting the ester with a primary or secondary alkylamine. The hydrazides can be prepared by reacting the ester with hydrazine or an alkylhydrazine. The reaction takes place smoothly and is normally complete in ¼ to 2 hours as the reactants are heated at reflux temperatures in an alcoholic or aqueous solvent. The amounts of the reactants are not critical, though an excess of the ammonia, amine or hydrazine reactant is desirable. The product can be obtained as a residue by distilling off the more volatile constituents of the product mixture, or the latter can be poured into cold water to precipitate the amide or hydrazide. The product can be further purified by conventional procedures.

The compounds of the present invention wherein Z is a nitrile derivative of an oxyloweralkanoic aicd group can be prepared by reacting the amide derivatives, formed as described above, with phosphorus pentoxide for about ¼ to 2 hours at temperatures of 160° to 250° C. The reaction is usually conducted under reduced pressure and the nitrile product can either be continuously recovered, e.g., distilled off as it is formed or separated at the conclusion of the reaction.

The compounds of the present invention which are salts are those which are formed by reacting the (trifluoromethyl)pyridine compounds substituted by an oxyloweralkanoic acid group with the appropriate metal or ammonium or quaternary ammonium hydroxide or amine, including the alkylamines and alkanolamines containing from 1 to 12 carbon atoms. The salts can be those of alkali or alkaline earth metals such, for example, as sodium, potassium, lithium, magnesium or calcium, or of other metals such as copper, iron, zinc, cobalt, nickel, or of ammonium or substituted ammonium groups such as alkylamines and alkanolamines including the various mono-, di-, tri- and tetramethylammonium, mono-, di-, tri- and tetraethylammonium, n-propylammonium, isopropylammonium, diisopropylammonium and bis(3-hydroxypropyl)-ammonium salts. In carrying out the reaction, substantially equivalent or stoichiometric proportions of the acid and base are mixed together in a suitable solvent such as alcohol-water, whereupon a reaction takes place with the formation of the desired salt product and water as a byproduct. The salt may or may not be soluble in the reaction medium. If insoluble, it may be recovered by filtration or other liquid-solid separatory procedures; if soluble, it may be recovered by distilling, evaporating or otherwise removing the solvent and water. The recovered salt can be purified by conventional methods. In an alternative procedure, salts of metals such as copper which form difficultly soluble hydroxides can be prepared by reacting an alkali metal salt of the (trifluoromethyl)pyridine compound with a soluble mineral acid salt of said metal, such as chloride or nitrate, to produue the desired metal salts. The reaction takes place readily as substantially equivalent proportions of the reactants are stirred together in a water or water-alcohol solvent at room temperature or with gentle warming for ½ to 2 hours, whereupon the desired metal salt usually precipitates in the raection mixture and may be recovered and purified by known methods.

The compounds of the present invention may be prepared by adaptations of procedures known to the skilled in the art. Thus, it is to be understood that modifications of other methods known in the art for the preparation of compounds having similar Z groups can be substituted for the above procedures.

DESCRIPTION OF THE PREFERRED EMBODIMENTS

The following examples illustrate the invention but are not to be construed as limiting:

EXAMPLE 1

6-(trifluoromethyl)-2-pyridinol

The compound 2-chloro-6-(trifluoromethyl)pyridine (30 g., 0.165 mole) is added to 144 ml. of dimethyl sulfoxide, along with sodium hydroxide (21.1 g., 0.526 mole) in 80 ml. of water. The mixture is then heated under reflux conditions for 2 hours, following which it is poured over ice water. The resulting aqueous system is extracted with hexane, filtered to remove a scum and then acidified with hydrochloric acid. The mixture is then cooled and the white crystals present are filtered off and dried. The product recovered in the amount of 23 g., is identified by infrared analysis as 6-(trifluoromethyl)-2-pyridinol. This analysis is confirmed by elemental analysis which discloses the compound to have carbon, hydrogen and nitrogen contents of 44.21, 2.41 and 8.72 percent, respectively, as against theoretical values for the subject compound of 44.18, 2.47 and 8.59 percent respectively. The compound, which has a melting point of 124°–125.5° C., is moderately soluble in hot water and has good solubility in acetone and benzene.

EXAMPLE 2

6-chloro-4-(trifluoromethyl)-2-pyridinol

In substantially the same manner as described in Example 1, 2,6-dichloro-4-(trifluoromethyl)pyridine and sodium hydroxide are refluxed in dimethyl sulfoxide. The product is recovered by diluting the reaction mixture with water, acidifying, and recovering the white solid which is dried, then dissolved in dichloromethane and finally recovered as a residue by distilling off the solvent. This compound, identified by infrared analysis as 6-chloro-4-(trifluoromethyl)-2-pyridinol, has a melting point of 92.5° to 95.5° C. Elemental analysis discloses it to have carbon, hydrogen, chlorine, fluorine and nitrogen contents of 36.6, 1.4, 18.08, 28.74 and 6.7 percent, respectively, as against theoretical values of 36.48, 1.53, 17.95, 28.85 and 7.09 percent, respectively, for the subject compound.

EXAMPLE 3

3,5-dichloro-2-(trifluoromethyl)-4-pyridinol

The compound 3,4,5-trichloro-2-(trifluoromethyl)pyridine (10.1 g., 0.043 mole) is added to 40 ml. of ethanol along with sodium hydroxide (4.04 g., 0.101 mole) in 15 ml. of water. The mixture is then heated under reflux conditions for 2 hours. The cooled reaction mixture is then diluted with water and acidified with hydrochloric acid. On being cooled in an ice bath, a white solid precipitates which is filtered off, washed in hexane and dried. The product, recovered in an amount of 8.07 g., is a white crystalline solid having a melting point of 175.6°–177.6° C. which is substantially insoluble in water and has good solubility in benzene and acetone. It is identified by infrared analysis, as 3,5-dichloro-2-(trifluoromethyl)-4-pyridinol. The identity of the compound is confirmed by elemental analysis which discloses carbon, hydrogen, chlorine and nitrogen contents of 30.86, 0.65, 30.22 and 5.89 percent, respectively, as against theoretical values of 31.06, 0.87, 30.57 and 6.04 percent, respectively.

EXAMPLE 4

2,3,5-trichloro-6-(trifluoromethyl)-4-pyridinol

The compound 2,3,4,5-tetrachloro-6-(trifluoromethyl) pyridine (12 g., 0.0421 mole) is dissolved in dimethyl sulfoxide along with sodium hydroxide (4.04 g., 0.101 mole) in 15 ml. of water. The solution is heated at 99° C. for ½ hour. The mixture is then diluted with water, acidified and the resulting solid precipitate is filtered off and recrystallized from hexane and then from a benzene-hexane solution. The solid is then dissolved in a sodium hydroxide solution and reprecipitated with hydrochloric acid, yielding 5.5 grams of a white crystalline product having a melting point of 152.5°–154.5° C. which is substantially insoluble in water and has good solubility in acetone and (hot) benzene. The compound is identified by infrared analysis as 2,3,5-trichloro-6-(trifluoromethyl)-4-pyridinol, and this analysis is confirmed by elemental analysis which shows the compound to have carbon, hydrogen, chlorine, nitrogen and fluorine contents of 26.87, 0.48, 40.18, 5.14 and 21.59 percent, respectively, as against theoretical values of 27.04, 0.38, 39.92, 5.26 and 21.39 percent, respectively.

EXAMPLE 5

3,5-dichloro-6-(trifluoromethyl)-2-pyridinol

The compound 6-(trifluoromethyl)-2-pyridinol, formed as in Example 1, is added in the amount of 11 g., (0.0673 mole) to 100 ml. of 6 N hydrochloric acid. Chlorine gas is then passed through the solution until the organic phase is converted to a solid. The latter is dissolved in hexane, dried with sodium sulfate, and then recovered as a residue by evaporating off the hexane. The material is then recrystallized from pentane, yielding 7.2 grams of a white crystalline material having a melting point of 70.2°–72.2° C. which is insoluble in water and has good solubility in acetone and benzene. It is identified by infrared analysis as 3,5-dichloro-6-(trifluoromethyl)-2-pyridinol, and this analysis is confirmed by elemental analysis which discloses carbon, hydrogen, chlorine, nitrogen and fluorine contents of 31.14, 0.90, 30.47, 5.89 and 24.45 percent, respectively, as against theoretical values of 31.06, 0.87, 30.57, 6.04 and 24.57 percent, respectively.

EXAMPLE 6

2,3,5-trichloro-6-(trifluoromethyl)-4-pyridinethiol

The compound 2,3,4,5-tetrachloro-6-(trifluoromethyl) pyridine (25 g., 0.0878 mole) is rapidly added to a refluxing slurry of sodium sulfide nonahydrate (22.1 g., 0.092 mole) in 300 ml. of isopropanol. The resulting mixture is refluxed for 3 hours, after which it is diluted with water, together with caustic, and extracted with hexane to remove any unreacted material present. The reaction mixture is then acidified, cooled and filtered to remove the crystalline product which is present. This material is recrystallized from hexane and dried, yielding 3.41 grams of a pale yellow solid having a melting point of 77°–78° C. which is identified by infrared analysis as 2,3,5-trichloro-6-(trifluoromethyl)-4-pyridinethiol. The identity of the compound is confirmed by elemental analysis which discloses it to have carbon, hydrogen, chlorine, fluorine, nitrogen and sulfur contents of 25.37, 0.40, 37.53, 20.40, 5.02 and 11.50 percent, respectively, as against theoretical values of 25.51, 0.36, 37.66, 20.18, 4.96 and 11.33 percent, respectively. The compound is substantially insoluble in water and has good solubility in benzene and acetone.

EXAMPLE 7

3,5-dichloro-4-methylthio-2-(trifluoromethyl)pyridine

The compound 3,4,5-trichloro-2-(trifluoromethyl)pyridine (10 g., 0.04 mole) is dissolved in 10 ml. of methanol and brought to reflux temperature. To the latter solution is then slowly dropped in 3 g. (0.042 mole) of sodium thiomethoxide in 50 ml. of methanol. The solution is then refluxed for 4 hours, after which the salt present is filtered off and the methanol evaporated. The residue is added to hexane and the salts again filtered off. The hexane solution is then placed in a Dry Ice bath, thereby obtaining a crop of crystals (5.91 g.) which, on being filtered off and subjected to vapor phase chromatographic analysis, is disclosed to be 3,5-dichloro-4-methylthio-2-(trifluoromethyl)pyridine admixed with a very small percentage of the starting pyridine compound.

EXAMPLE 8

3,5-dichloro-4-((p-chlorophenyl)thio)-2-(trifluoromethyl)pyridine

The compound 3,4,5-trichloro-2-(trifluoromethyl)pyridine (9 g., 0.036 mole) is dissolved in 50 ml. of methanol and brought to reflux. To this refluxing solution is slowly added 6.03 g. (0.036 mole) of sodium p-chlorothiophenoxide in 70 ml. of methanol. The resulting mixture is then refluxed for 9 hours, after which the salts are filtered off and the methanol removed under vacuum. The residue is put into hot hexane and additional salt is filtered off. The hexane solution is cooled in a Dry Ice bath to crystallize out the desired compound which is recovered in a yield of 11 grams. It is identified by infrared and vapor phase chromatographic analysis as 3,5-dichloro-4-((p-chlorophenyl)thio)-2-(trifluoromethyl)pyridine.

EXAMPLE 9

3,5-dichloro-4-(methylsulfonyl)-2-(trifluoromethyl)-pyridine

The compound 3,5-dichloro-4-methylthio-2-(trifluoromethyl)pyridine (8.58 g., 0.033 mole), as prepared in Example 7, is dissolved in 35 ml. of glacial acetic acid, and to this solution is slowly added, with stirring, 13.08 g. (0.115 mole) of 30 percent hydrogen peroxide. The mixture is refluxed for 1 hour and then poured over ice. The solid is filtered off, slurried with hexane, then filtered again and dried. The compound, recovered in a yield of 6.85 g., is a white solid melting at 104.5°–107.5° C. which is substantially insoluble in water and has good solubility in benzene and acetone. Infrared analysis identifies the compound as 3,5-dichloro-4-(methylsulfonyl)-2-(trifluoromethyl)pyridine, and this identification is confirmed by elemental analysis which shows the compound to have carbon, hydrogen, chlorine, nitrogen and sulfur contents of 28.56, 1.11, 23.92, 4.56 and 11.18 percent, respectively, as against theoretical values of 28.59, 1.37, 24.11, 4.76 and 10.90 percent, respectively.

EXAMPLE 10

3,5-dichloro-4-((p-chlorophenyl)sulfonyl)-2-(trifluoromethyl)pyridine

In a manner essentially the same as described in Example 9, the 3,5-dichloro-4-((p-chlorophenyl)thio)-2-(trifluoromethyl)pyridine product of Example 8 is oxidized to 3,5-dichloro-4-((p-chlorophenyl)sulfonyl)-2-(trifluoromethyl)pyridine. The latter compound is a white solid having a melting point of 102.5°—105.5° C. It is substantially insoluble in water and has good solubility in acetone and benzene.

EXAMPLE 11

3,5-dichloro-4-methoxy-2-(trifluoromethyl)pyridine

The compound 3,4,5-trichloro-2-(trifluoromethyl)pyridine (9 g., 0.0359 mole) is added to 20 ml. of methanol, and to the resulting solution is slowly added a solution prepared by dissolving 23 grams of sodium (0.0377 mole) in 60 ml. of methanol, the temperature of the reaction mixture being 66° C. The solution is then refluxed for a period of 6 hours, following which the salt is filtered off and the methanol is distilled from the filtrate. Hexane is added to the residue, and the resulting hexane solution is washed with water. The hexane solution is then dried with sodium sulfate and concentrated, after which it is cooled in a Dry Ice bath to crystallize out the desired product which is recovered in the amount of 6.59 grams. This compound, which is a white solid melting at 33.2° — 34.2° C., insoluble in water and highly soluble in benzene and acetone, is identified by infrared analysis as 3,5-dichloro-4-methoxy-2-(trifluoromethyl)pyridine. This is confirmed by elemental analysis which shows the compound to have carbon, hydrogen, chlorine and nitrogen contents of 33.9, 1.4, 28.6 and 5.5 percent, respectively, as against theoretical contents of 34.17, 1.64, 28.82 and 5.67 percent respectively.

EXAMPLE 12

2,3,5-trichloro-4-methoxy-6-(trifluoromethyl)pyridine

In substantially the same manner as described in Example 11, the foregoing compound is prepared by the reaction of 3,4,5,6-tetrachloro-2-(trifluoromethyl)pyridine and NaOCH$_3$ in methanol. The product is a pale yellow waxy material having a melting point of 33.2°—34.2° C. which is substantially insoluble in water and highly soluble in acetone and benzene. Its identity is confirmed by elemental analysis which discloses the compound to have carbon, hydrogen, chlorine and nitrogen contents of 29.8, 1.3, 37.5 and 5.0 percent, respectively, as against theoretical contents of 29.97, 1.08, 37.93 and 4.99 percent, respectively.

EXAMPLE 13

2,3,5-trichloro-4-isopropoxy-6-(trifluoromethyl)pyridine

In substantially the same manner as described in Example 11, the foregoing compound is prepared by the reaction of 2,3,4,5-tetrachloro-6-(trifluoromethyl)pyridine and sodium isopropylate in isopropanol, the reflux period being extended to 5½ hours. The product is a white waxy material having a melting point of 31°—34° C. which is insoluble in water and highly soluble in acetone and benzene. Its identity is confirmed by elemental analysis which discloses the compound to have carbon, hydrogen, chlorine, fluorine and nitrogen contents of 34.6, 2.2, 35.99, 19.16 and 4.8 percent, respectively, as against theoretical values of 35.04, 2.29, 34.48, 18.48 and 4.54 percent, respectively.

EXAMPLE 14

2-methoxy-6-(trifluoromethyl)pyridine

In substantially the same manner as described in Example 11, 2-chloro-6-(trifluoromethyl)pyridine (10 g., 0.055 mole) is reacted with sodium methylate in a mixed dimethyl sulfoxide-methanol solvent. There is recovered 4.5 g. of a colorless oil identified by infrared analysis as 2-methoxy-6-(trifluoromethyl)pyridine. The compound is insoluble in water and has good solubility in acetone and benzene. Elemental analysis discloses the compound to have carbon, hydrogen, fluorine and nitrogen contents of 47.1, 3.2, 33.13 and 8.2 percent, respectively, as against theoretical values of 47.46, 3.41, 32.18 and 7.91 percent, respectively.

EXAMPLE 15

2-allyloxy-6-(trifluoromethyl)pyridine

The compound 2-chloro-6-(trifluoromethyl)pyridine (6 g., 0.033 mole) is added to a flask containing 0.851 g. sodium (0.037 mole) dissolved in 12 ml. of allyl alcohol. The mixture is refluxed for 8 hours, following which it is diluted with water. The insoluble precipitate which then forms is taken up in hexane, the solution is dried, and the hexane is distilled off. There is obtained 4.71 grams of a white solid which is identified by infrared analysis as 2-allyloxy-6-(trifluoromethyl)pyridine. Elemental analysis discloses the product to have carbon, hydrogen, fluorine and nitrogen contents of 52.7, 4.1, 27.79 and 7.0 percent, respectively, as against theoretical values of 53.3, 3.97, 28.1 and 6.92 percent, respectively, for the subject compound.

EXAMPLE 16

2-((3,4-dichlorophenyl)oxy)-6-(trifluoromethyl)pyridine

The foregoing compound is prepared by dissolving 0.664 g. of sodium (0.0288 mole) in 10 ml. of ethanol, adding 4.48 g. of 3,4-dichlorophenol (0.0275 mole), heating the solution for ½ hour at 70° C., and then adding 5 g. of 2-chloro-6-(trifluoromethyl)pyridine (0.0275 mole) to the mixture. The resulting reaction mixture is then refluxed for 15 hours at 100° C., after which the salt present as a solid is filtered off and the filtrate is diluted with water. The resulting insoluble product is taken up in hexane, the solution is dried and concentrated, and the product is crystallized out by cooling the solution in a Dry Ice bath. The crystal material recovered is dried under dichloromethane, there being recovered 4.93 g. of a white solid melting at 52.2–54.2° C. which is identified by infrared analysis as 2-((3,4-dichlorophenyl)oxy)-6-(trifluoromethyl)pyridine. Elemental analysis discloses the compound to have carbon, hydrogen, chlorine, fluorine, nitrogen and oxygen contents of 46.8, 1.9, 23.24, 18.75, 4.2 and 5.11 percent respectively, as against theoretical values of 46.7, 2.28, 22.9, 18.4, 4.53 and 5.8 percent, respectively.

EXAMPLE 17

3,5-dichloro-2-((3,4-dichlorophenyl)oxy)-6-(trifluoromethyl)pyridine

In a manner generally the same as that described in Example 16, the foregoing compound is prepared in a yield of 36 percent by the reaction of 2,3,5-trichloro-6-(trifluoromethyl)pyridine with the sodium derivative of 3,4-dichlorophenol. The compound, a white solid having a melting point of 84°–87° C., is identified by infrared analysis, and the identity is confirmed by elemenal analysis which shows the compound to have carbon, hydrogen, chlorine, fluorine and nitrogen contents of 39.0, 1.2, 37.93, 14.96 and 3.3 percent, respectively, as against theoretical values for the subject compound of 38.3, 1.07, 37.6, 15.1 and 3.72 percent, respectively.

EXAMPLE 18

2-chloro-4-amino-6-(trifluoromethyl)pyridine

The compound 2,4-dichloro-6-(trifluoromethyl)pyridine (13.73 g., 0.0636 mole) is placed in a high pressure vessel along with an excess of ammonia. The vessel is then sealed and heated at 100° C. for 2 hours. The contents are then slurried with hot water, cooled and filtered, thereby obtaining a white solid product (10.02 g.) identified by infrared analysis as 2-chloro-4-amino-6-(trifluoromethyl)pyridine. It has a melting point of 79°–82° C., is moderately soluble in water and highly soluble in acetone and benzene. It is found to have carbon, hydrogen, chlorine, fluorine and nitrogen contents of 36.35, 1.88, 18.17, 28.93 and 14.19 percent, respectively, versus calculated values of 36.66, 2.04, 18.04, 29.0 and 14.25 percent, respectively.

EXAMPLE 19

2-chloro-4-(trifluoromethyl)-6-aminopyridine

In substantially the same manner as in Example 18, 2,6-dichloro-4-(trifluoromethyl)pyridine (15 g., 0.0696 mole) is reacted with ammonia at 100° C. for 4 hours. There is obtained 11.24 g. of a buff-colored solid having a melting point of 53.2°–56.2° C. It is identified by infrared analysis as 2-chloro-4-(trifluoromethyl)-6-aminopyridine. It is found to have carbon, hydrogen, chlorine, fluorine and nitrogen contents of 36.4, 1.9, -18.27, 28.83 and 14.2 percent, respectively, versus calculated values of 36.6, 2.05, 18.1, 29.0 and 14.3 percent, respectively.

EXAMPLE 20

2-amino-6-(trifluoromethyl)pyridine

The foregoing compound is prepared by reacting 2-chloro - 6 - (trifluoromethyl)pyridine with ammonia in substantially the same fashion as described above in Example 18 except that here the contents of the pressure vessel are heated for 10 hours at 150° C., and the solid product is recovered from the reaction mixture by slurrying with water, filtering and washing with pentane. The compound is identified by infrared analysis as 2-amino-6-(trifluoromethyl)pyridine, and this identity is confirmed by elemental analysis which shows the compound to have carbon, hydrogen, fluorine and nitrogen contents of 44.2, 2.9, 34.83 and 17.2 percent, respectively, as against theoretical values of 44.4, 3.1, 35.1 and 17.3 percent, respectively.

EXAMPLE 21

3,5-dichloro-4-amino-2-(trifluoromethyl)pyridine

The compound 3,4,5-trichloro-2-(trifluoromethyl)pyridine (12 g., 0.048 mole) is dissolved in dimethyl sulfoxide and the solution is maintained at 130°–135° C. as ammonia gas is bubbled therethrough for approximately 4 hours. The solution is then cooled and diluted with a weak hydrochloric acid solution, following which it is extracted with dichloromethane. The dichloromethane is then distilled off and the residue is then washed with water, taken up in pentane and recrystallized therefrom. The white solid compound so recovered in an amount of 6.22 grams is identified by vapor phase chromatographic analysis as 3,5-dichloro-4-amino-2-(trifluoromethyl)pyridine. Elemental analysis discloses it to have carbon, hydrogen, chlorine and nitrogen and fluorine contents of 31.38, 1.31, 30.45, 12.30 and 24.40 percent, respectively, as against theoretical values of 31.19, 1.31, 30.70, 12.13 and 24.67 percent, respectively.

EXAMPLE 22

3,5-dichloro-4-hydrazino-2-(trifluoromethyl)pyridine

The compound 3,4,5-trichloro-2-(trifluoromethyl)pyridine (10 g., 0.04 mole) is dissolved in 30 ml. of isopropanol. The temperature of the solution is maintained at 60°–65° C. as hydrazine hydrate in 20 ml. of isopropanol is slowly added over the course of 30 minutes. The solution is then refluxed for 5 minutes and poured into ice water. A white solid is filtered off and washed with hot hexane. There is recovered 5.65 grams of a white solid having a melting point of 129.9–132.9° C. which is moderately soluble in water and highly soluble in acetone and benzene. It is identified by infrared analysis as 3,5-dichloro-4-hydrazino-2-(trifluoromethyl)pyridine, and elemental analysis discloses it to have carbon, hydrogen, chlorine, nitrogen and fluorine contents of 29.25, 1.61, 28.62, 16.89 and 23.63 percent, respectively, as against theoretical values of 29.29, 1.64, 28.82, 17.08 and 23.17 percent, respectively.

EXAMPLE 23

Using a method generally the same as that disclosed in Example 22, the following compounds are prepared:

3,5-dichloro - 4 - (ethylhydrazino)-2-(trifluoromethyl)pyridine having a molecular weight of 274.06 by the reaction of ethylhydrazine with 3,4,5-trichloro-2-(trifluoromethyl)pyridine.

3,5-dichloro - 4 - (1,1-dimethylhydrazino)-2-(trifluoromethyl)pyridine having a molecular weight of 274.06 by the reaction of 1,1-dimethylhydrazine with 3,4,5-trichloro-2-(trifluoromethyl)pyridine.

EXAMPLE 24

4-(butylamino)-3,5-dichloro-2-(trifluoromethyl)pyridine

The compounds 3,4,5 - trichloro-2-(trifluoromethyl)pyridine (7 g., 0.0279 mole) and n-butylamine (4.18 g., 0.0572 mole) are dissolved in 30 ml. of toluene and maintained at a temperature of about 70° C. for ½ hour. The mixture is then refluxed for approximately 10 hours, with a further amount of 2.5 grams of n-butylamine being added at a mid point in the reflux period. The toluene is then distilled from the reaction mixture and the residue is washed with dilute hydrochloric acid and then with water. There is recovered 6.52 g. of an orange colored wax which is moderately soluble in water and highly soluble in benzene and acetone. It is identified by vapor phase chromatographic analysis as 4-(butylamino)-3,5-dichloro-2-(trifluoromethyl)pyridine. Elemental analysis discloses it to have carbon, hydrogen, chlorine and nitrogen contents of 41.74, 3.75, 24.78 and 9.60 percent, respectively, as against theoretical values of 41.83, 3.86, 24.70 and 9.76 percent, respectively.

EXAMPLE 25

3,5-dichloro-4-(dipropylamino)-2-(trifluoromethyl)pyridine

The compounds 3,4,5 - trichloro-2-(trifluoromethyl)pyridine (11 g., 0.0439 mole) and diisopropylamine (9.1 g., 0.09 mole) are dissolved in 50 ml. of toluene and refluxed for a period of about 24 hours, a further amount of diisopropylamine (15 ml.) being added at a mid point in this reflux period. The toluene is then removed under vacuum, and the residue is refluxed for a further period of 20 hours, with further amounts of diisopropylamine, totalling 30 ml., being added as the reaction progresses. At this point the salt present in the reaction mixture is filtered off and the filtrate is taken up in hexane. The hexane solution is washed first with dilute hydrochloric acid and then with water. The solvent is then stripped off under vacuum, and the residual material is identified by vapor phase chromatographic analysis as 3,5-dichloro-4-(dipropylamino)-2-(trifluoromethyl)pyridine. It is a yellow oil, which is insoluble in water and highly soluble in acetone and benzene. Elemental analysis discloses it to have carbon, hydrogen, chlorine and nitrogen contents of 44.30, 3.91, 22.72 and 7.31 percent, respectively, as against theoretical contents of 45.73, 4.80, 22.5 and 8.89 percent, respectively.

EXAMPLE 26

2,3,5-trichloro-4-(isopropylamino)-6-(trifluoromethyl)pyridine

The compound 2,3,4,5-tetrachloro-6-(trifluoromethyl)pyridine (20 g., 0.06 mole) is dissolved in 60 ml. of dimethyl formamide, and to the solution is slowly added 7.45 g. (0.126 mole) of isopropylamine. The mixture is allowed to stand, with stirring, for 3 hours, and is then heated at 70° C. for 2 hours. The insoluble oil present in the reaction mixture is then taken up in hexane and dried with sodium sulfate, after which the hexane is distilled off. The residue is recrystallized from ethanol and dried under carbon tetrachloride. There is recovered 14.5 g. of a product identified by infrared analysis as 2,3,5-trichloro - 4 - (isopropylamino)-6-(trifluoromethyl)pyridine. It is a white waxy solid melting at 31–34° C. which is insoluble in water and highly soluble in acetone and benzene.

EXAMPLE 27

((6-(trifluoromethyl)-2-pyridyl)oxy)-acetic acid ethyl ester

The compound 6-(trifluoromethyl)-2-pyridinol (4.4 g., 0.027 mole) is added to a solution of sodium (0.66 g., 0.0284 mole) in 100 ml. of ethanol and the solution refluxed for ½ hour. A solution of 4.75 g. (0.0284 mole) of ethyl bromoacetate in 25 ml. of ethanol is then added dropwise over a ½ hour period following which the solution is refluxed for 7 hours. The reaction mixture is then cooled, the salts are filtered off, and the residue is slurried with hexane. Additional salts present are then filtered off, after which the hexane is removed under vacuum and the residual pale yellow oil is dried under dichloromethane to give 6.08 g. of a compound identified by infrared analysis as ((6-(trifluoromethyl)-2-pyridyl)oxy)-acetic acid ethyl ester. It is insoluble in water and soluble in benzene and acetone. Elemental analysis shows it to have carbon, hydrogen, fluorine and nitrogen contents of 48.77, 4.70, 22.78 and 5.62 percent, respectively, as against theoretical values of 48.20, 4.05, 22.87 and 5.62 percent, respectively.

EXAMPLE 28

((3,5-dichloro-6-(trifluoromethyl)-2-pyridyl)oxy) acetic acid ethyl ester

In substantially the same manner as described in Example 27, 3,5-dichloro-6-(trifluoromethyl)-2-pyridinol is reacted with sodium ethylate and with ethyl bromoacetate to produce ((3,5-dichloro-6-(trifluoromethyl)-2-pyridyl)oxy)-acetic acid ethyl ester. In this case however, the product is crystallized out by cooling a concentrated hexane solution rather than by distilling off the hexane under vacuum. The compound so recovered in 65 percent yield is a white solid melting at 64.5°–65.5° C. which is substantially insoluble in water and soluble in acetone and benzene. The identity of the compound, as set forth above, is established by infrared analysis and confirmed by elemental analysis which discloses it to have carbon, hydrogen, chlorine, fluorine and nitrogen contents of 37.71, 2.51, 22.18, 18.16 and 4.48 percent, respectively, as against theoretical values of 37.76, 2.54, 22.29, 17.92 and 4.40 percent, respectively.

EXAMPLE 29

((6-(trifluoromethyl)-2-pyridyl)oxy)methylacetic acid ethyl ester

In substantially the same manner as described in Example 27, 6-(trifluoromethyl)-2-pyridinol is reacted with sodium ethylate and with 2-bromopropionate to produce ((6-(trifluoromethyl) - 2 - pyridyl)oxy)methylacetic acid ethyl ester. The product, a white solid, is identified by infrared analysis and this identity is confirmed by elemental analysis which discloses the compound to contain carbon, hydrogen, fluorine and nitrogen in amounts of 49.7, 5.0, 18.34 and 4.8 percent, respectively, as against theoretical values of 50.0, 4.96, 21.5 and 5.3 percent, respectively.

EXAMPLE 30

((6-(trifluoromethyl)-2-pyridyl)oxy)acetic acid isobutyl ester

The above compound is prepared by heating for 1 hour at 100 C. a mixture of 5 grams (0.0201 mole) of ((6-(trifluoromethyl)-2-pyridyl)oxy)acetic acid ethyl ester and 2.64 g. (0.0362 mole) of isobutanol in the presence of 0.15 g. of p-toluene sulfonic acid as catalyst. The reaction mixture is washed with sodium bicarbonate solution and with water and then distilled under vacuum. The desired compound is recovered as a colorless oil in the amount of 3.27 g. as the fraction boiling at 195 C. at 24 mm. Hg. This product is identified by infrared analysis as ((6-(trifluoromethyl)-2-pyridyl)oxy)acetic acid isobutyl ester, and this analysis is confirmed by elemental analysis which discloses the compound to have carbon, hydrogen, fluorine and nitrogen contents of 51.84, 4.49, 19.95 and 4.83 percent, respectively, as against theoretical values of 52.1, 5.1, 20.6 and 5.06 percent, respectively.

EXAMPLE 31

((6-(trifluoromethyl)-2-pyridyl)oxy)acetic acid

The ethyl ester of ((6-(trifluoromethyl)-2-pyridyl)oxy) acetic acid (13.23 g., 0.0564 mole) and an aqueous solution of sodium hydroxide (2.26 g., 0.0564 mole) are added to 100 ml. of ethanol and the solution is refluxed for 1 hour. The reaction mixture is then diluted with water and acidified with concentrated hydrochloric acid. The resultant precipitate is filtered off and dried. Additional product is recovered by extracting the filtrate with benzene and then evaporating the benzene from the extract. There is thus obtained a total of 10.26 g. of the compound identified by infrared analysis as ((6-(trifluoromethyl)-2-pyridyl)oxy)acetic acid. It is a white solid melting at 115–118 C. which is moderately soluble in water and of good solubility in acetone and benzene. The identity of the compound is confirmed by elemental analysis which discloses carbon, hydrogen, fluorine and nitrogen contents of 43.2, 2.5, 26.29 and 6.7 percent, respectively, as against theoretical values of 43.45, 2.74, 25.78 and 6.33 percent, respectively.

EXAMPLE 32

((6-(trifluoromethyl)-2-pyridyl)oxy)methylacetic acid

In substantially the same manner as described in Example 31, the foregoing compound is prepared by reacting the corresponding ethyl ester compound of Example 28 with an aqueous solution of sodium hydroxide. Here, however, the solution is refluxed for 2 hours rather than 1 hour, and the product is recovered as a white solid, melting at 109–111 C., by diluting the reaction mixture with water and extracting it with hexane. The mixture is then filtered and acidified to precipitate the desired compound which is identified by infrared analysis. Elemental analysis discloses it to have carbon, hydrogen, fluorine and nitrogen contents of 45.5, 3.3, 23.73 and 6.0 percent, respectively, as against theoretical values for the subject compound of 45.7, 3.84, 24.0 and 5.94 percent, respectively.

EXAMPLE 33

((3,5-dichloro-6-(trifluoromethyl)-2-pyridyl)oxy) acetic acid

In substantially the same manner as described in Example 31, the ethyl ester of ((3.5-dichloro-6-(trifluoromethyl)-2-pyridyl)oxy)acetic acid is reacted with sodium hydroxide. There is recovered in a yield of 70.8 percent a pale yellow solid melting at 126°–128° C. which is moderately soluble in water and highly soluble in acetone and benzene. Its identity, as set forth above, is established by infrared analysis and confirmed by elemental analysis which discloses the compound to have carbon, hydrogen, chlorine, fluorine and nitrogen contents of 33.37, 1.58, 24.21, 19.97 and 4.99 percent, respectively as against theoretical values of 33.13, 1.39, 24.45, 19.65 and 4.83.

EXAMPLE 34

((6-(trifluoromethyl)-2-pyridyl)oxy)acetamide

The ethyl ester of ((6-(trifluoromethyl)-2-pyridyl)oxy) acetic acid (30 g., 0.12 mole) is dissolved in 100 ml. of ethanol along with 90 ml. of concentrated ammonium hydroxide. The reaction mixture is stirred for 5 hours and then heated under reflux conditions for ½ hour. It is then poured over ice. The white precipitate which forms is filtered off, washed with hexane and dried under carbon tetrachloride to give 19.53 g. of a compound identified as the captioned acetamide by infrared analysis. It has a melting point of 124°–126° C. and is substantially insoluble in water and highly soluble in benzene and acetone. The identity of the compound is confirmed by elemental analysis which discloses the presence of carbon, hydrogen, fluorine and nitrogen in amounts of 44.0, 3.3, 26.08 and 13.2 percent, respectively, as against theoretical contents of 43.64, 3.21, 25.89 and 12.73 percent, respectively.

EXAMPLE 35

In a manner similar to that described in Example 34, the ethyl ester of ((6 - trifluoromethyl)-2-pyridyl)oxy) acetic acid is reacted with a concentrated, aqueous solution of hydrazine to prepare the hydrazide of said acid having a molecular weight of 235.16.

EXAMPLE 36

((6-(trifluoromethyl)-2-pyridyl)oxy)-N,N-dimethyl-
acetamide

The foregoing compound is prepared by reacting 4.8 g. (0.0193 mole) of the corresponding ethyl ester product, as prepared in Example 27, with 10 ml. (0.0579 mole) of a 40 percent aqueous solution of dimethylamine, along with 5 ml. of ethanol. The reaction mixture, after being allowed to stand for several hours, is refluxed for 1 hour and then poured over ice. These is recovered 2 g. of a white solid which is dried under carbon tetrachloride. This solid, which melts at 85°–88° C., is identified by infrared analysis as ((6 - (trifluoromethyl) - 2-pyridyl)oxy)-N,N-dimethylacetamide. Elemental analysis discloses the compound to have carbon, hydrogen, fluorine and nitrogen contents of 48.4, 4.6, 22.52 and 11.3 percent, respectively, as against theoretical values of 48.4, 4.44, 23.0 and 11.3 percent, respectively.

EXAMPLE 37

In a manner similar to that described in Example 36, the following compounds are prepared:

((6 - (trifluoromethyl) - 2 - pyridyl)oxy)-N-ethylacetamide having a molecular weight of 248.19 by the reaction of the ethyl ester of ((6 - (trifluoromethyl)-2-pyridyl)oxy)acetic acid with ethylamine.

The ethylhydrazide of ((6-(trifluoromethyl)-2-pyridyl)oxy)acetic acid having a molecular weight of 263.2 by the reaction of the ethyl ester of said acid with ethylhydrazine.

The N,N (or 1,1) dimethylhydrazide of ((6-trifluoromethyl) - 2 - pyridyl)oxy)acetic acid having a molecular weight of 263.2 by the reaction of the ethyl ester of said acid with N,N-dimethylhydrazine.

EXAMPLE 38

((6-(trifluoromethyl)-2-pyridyl)oxy)acetonitrile

The compounds phosphorus pentoxide (95 g. 0.067 mole) and ((6 - (trifluoromethyl) - 2 - pyridyl)oxy) acetamide (10 g., 0.0443 mole) are combined and heated at 170°–180° C. for ½ hour. The reaction mixture is then heated strongly under aspirator vacuum to distill over the desired product. The latter material is recrystallized from pentane and dried under dichloromethane to give 6 g. of a white solid product melting at 47.5°–48.5° C. which is substantially insoluble in water and highly soluble in acetone and benzene. It is identified by infrared analysis as the captioned acetonitrile, and this identity is confirmed by elemental analysis which shows the compound to have carbon, hydrogen, fluorine and nitrogen contents of 47.0, 2.8, 28.29 and 13.4 percent, respectively, as against theoretical values of 47.53, 2.49, 28.20 and 13.86 percent, respectively.

EXAMPLE 39

Sodium salt of ((6-(trifluoromethyl)-2-pyridyl)oxy)
acetic acid ((6 - (trifluoromethyl) - 2 - pyridyl)oxy)acetic acid (22.1 g., 0.1 mole) is added to a solution of sodium hydroxide (4.6 g., 0.2 mole) in 200 ml. of 50 percent aqueous ethanol. The resulting mixture is heated at reflux temperatures until a homogenous solution is obtained. The solution is then distilled under reduced pressure to remove the water and ethanol leaving as residue the desired sodium salt having a molecular weight of 243.13.

EXAMPLE 40

In a manner similar to that described in Example 39, the following compounds are prepared:

Potassium salt of ((6-(trifluoromethyl)-2-pyridyl)oxy) acetic acid having a molecular weight of 259.24 by the reaction of ((6 - trifluoromethyl)-2-pyridyl)oxy)acetic acid and potassium hydroxide.

Ammonium salt of ((3,5 - dichloro - 6 - (trifluoromethyl) - 2 - pyridyl)oxy)acetic acid having a molecular weight of 306.06 by the reaction of ((3,5-dichloro-6-(trifluoromethyl) - 2 - pyridyl)oxy)acetic acid and ammonium hydroxide.

Sodium salt of ((6 - (trifluoromethyl)-2-pyridyl)oxy) methylacetic acid having a molecular weight of 257.16 by the reaction of ((6-(trifluoromethyl) - 2 - pyridyl)oxy) methylacetic acid and sodium hydroxide.

EXAMPLE 41

3,5-dichloro-2-fluoro-6-(trifluoromethyl)-4-pyridinol

In a manner similar to that described in Example 4, the compound 3,5 - dichloro - 2,4 - difluoro - 6-(trifluoromethyl)pyridine is reacted with sodium hydroxide to produce 3,5 - dichloro - 2 - fluoro - 6 - (trifluoromethyl)-4-pyridinol having a molecular weight of 250.

EXAMPLE 42

2-fluoro-6-(trifluoromethyl)-4-pyridinol

In a manner similar to that described in Example 1, the compound 2,4 - difluoro-6-(trifluoromethyl)pyridine is reacted with sodium hydroxide to produce 2-fluoro-6-(trifluoromethyl)-4-pyridinol having a molecular weight of 181.1.

EXAMPLE 43

3,5-dichloro-2-fluoro-4-amino-6-(trifluoromethyl)
pyridine

In a manner similar to that described in Example 18, the compound 3,5 - dichloro - 2,4 - difluoro-6-(trifluoromethyl)pyridine is reacted with ammonia to produce 3,5-dichloro - 2 - fluoro - 4 - amino-6-(trifluoromethyl) pyridine having a molecular weight of 249.01.

EXAMPLE 44

((3,5-dichloro-2-fluoro-6-(trifluoromethyl)-4-pyridyl)
oxy)acetic acid ethyl ester In a manner similar to that described in Example 27, the compound 3,5-dichloro-2-fluoro-6-(trifluoromethyl)-4-pyridinol is reacted with sodium ethylate and with ethyl bromoacetate to produce 3,5-dichloro-2-fluoro-6-(trifluoromethyl)-4-pyridyl)oxy)acetic acid ethyl ester having a molecular weight of 336.09.

EXAMPLE 45

((3,5-dichloro-2-fluoro-6-(trifluoromethyl)-4-pyridyl)
oxy)acetic acid

In a manner similar to that described in Example 31, the ester compound of Example 44 is reacted with sodium hydroxide to produce ((3,5-dichloro-2-fluoro-6-(trifluoromethyl) - 4 - pyridyl)oxy)acetic acid having a molecular weight of 308.03.

EXAMPLE 46

((3,5-dichloro-2-fluoro-6-(trifluoromethyl)-4-
pyridyl)oxy)acetamide

In a manner similar to that described in Example 34, the acid compound of Example 45 is reacted with ammonium hydroxide to produce ((3,5-dichloro-2-fluoro-6-(trifluoromethyl)-4-pyridyl)oxy)acetamide having a molecular weight of 307.05.

The substituted (trifluoromethyl)pyridine compounds of the present invention are useful as pesticides and have particular utility as herbicides, nematocides, bacteriocides and parasiticides. The compounds can be employed as pesticides by distributing the compound, in a pesticidally effective quantity and usually in the form of a composition containing adjuvants to aid in dispersing the same, so as to contact directly the plant or other organism to be controlled or, alternatively, so as to contact the growth medium or habitat of the organisms whereby eventual contact with said organisms will be established. For the control of weeds and other higher plant pests, the organisms are contacted with a pesticidal amount which is also a herbicidal amount of the compound. Thus, many weed pests are controlled by the distribution in soil of from about 0.1 to 50 pounds or more of the chemical per acre so as to contact seeds and emerging seedlings of the vegetation to be controlled. For the control of bacterial and fungal pests, including those forms occurring in various paint, paper pulp and wood impregnating formulations, the active chemicals are applied in the form of compositions containing from 10 to 500 or more parts of the chemical per million parts by weight of the composition. In the control of nematodes, good results are obtained by distributing the active compounds in soil in amounts of from about 1 to 25 parts or more per million parts by weight of soil. In the control of parasitic pests, a pesticidal amount which is also an anthelminticidal amount is used.

For such herbicidal, bacteriocidal, fungicidal and nematocidal applications the active compounds hereof can be employed in unmodified form or in the form of a liquid or finely divided solid composition. Thus, the compounds can be dispersed in a finely divided solid and employed as dusts. The compounds and such solid dispersions can also be dispersed in water with or without the aid of a surface active agent and the resulting aqueous suspensions be employed as drenches or sprays for application to soil, weeds or otherwise. In other procedures, the compounds are employed as active constituents in solvent solutions, oil-in-water or water-in-oil emulsions or aqueous dispersions. The augmented compositions are adapted to be formulated as concentrates and subsequently diluted with additional liquid or solid adjuvants to prouce the ultimate treating compositions.

In representative operations, each of the compounds 3,5 - dichloro - 2 - (trifluoromethyl)-4-pyridinol, ((6-(trifluoromethyl) - 2 - pyridyl)oxy)acetic acid, ((3,5-dichloro-6-(trifluoromethyl) - 2 - pyridyl)oxy)acetic acid or 2,3,5-trichloro-6-(trifluoromethyl) - 4 - pyridinol, in an aqueous emulsified composition containing about 100 parts by weight of the active compound per million parts of the aqueous composition, when applied as a soil drench at a dosage rate of 5 pounds per acre, or less, provides complete herbicidal control of fertile soil planted with pigweed and wild morning glory. In addition, the two first mentioned compounds give complete control at this treating level of wild oats and crabgrass, among other weed pests. In similar tests, each of the compounds ((6-(trifluoromethyl) - 2 - pyridyl)oxy)acetic acid ethyl ester, ((6-trifluoromethyl) - 2 - pyridyl)oxy)acetonitrile, ((6-trifluoromethyl - 2 - pyridyl)oxy)acetamide and ((3-dichloro-6-(trifluoromethyl) - 2 - pyridyl)oxy)acetic acid, at a 5 pounds per acre dosage rate or less, gives essentially complete herbicidal control of fertile soil planted with wild morning glory, water grass and rape. In other similar tests, each of the chemicals 2-methoxy-6-(trifluoromethyl)pyridine, 2,3,5-trichloro - 4 - methoxy-6-(trifluoromethyl)pyridine, 3,5 - dichloro - 4-methoxy-6-(trifluoromethyl)pyridine, 2,3,5-trichloro-4-isopropoxy - 6 - (trifluoromethyl)pyridine, 2,3,5 - trichloro-6-(trifluoromethyl)-4-pyridinol, 3,5-dichloro - 6 - (trifluoromethyl)-2-pyridinol, 3,5-dichloro-4-(butylamino - 2 - (trifluoromethyl) pyridine, 2-chloro-4-amino - 6 - (trifluoromethyl)pyridine or 3,5 - dichloro-4-hydrazino-2-(trifluoromethyl)pyridine, at a dosage rate of 10 pounds per acre gives complete herbicidal control of fertile soil planted with pig weed. Various of the chemicals recited above are also effective in the control of one or more of the weed pests wild morning glory, wild oats, crabgrass, pigweed, water grass, rape, and curly dock when sprayed on the foliar portions of the plants at concentrations of from about 100 to 10,000 parts per million of the aqueous spray composition. When applied to soil at dosage levels of from about 5 to 50 pounds per acre, each of the compounds of the present invention which is not specifically recited above has utility in the control of one or more of the aforementioned or other weed pests.

The compounds 3,5-dichloro-6-(trifluoromethyl)-4-pyridinol, 3,5-dichloro - 4 - (methylsulfonyl)-2-(trifluoromethyl)pyridine, 3,5-dichloro - 4 - ((p-chlorophenyl)sulfonyl)-2-(trifluoromethyl)pyridine or 3,5-dichloro-4-methoxy-6-(trifluoromethyl)pyridine, at a dosage rate of 500 parts per million each, are found to give complete kill of *Staphylococcus ureus* as well as of the various bacterial and fungal organisms inducing paper pulp slime. The compound 2,3,5-trichloro-6-(trifluoromethyl) - 4 - pyridinethiol, at dosage rates of 10, 100, 500 and 500 parts per million gives complete kills of *Bacillus subtilis, Staphylococcus aureus, Escherichia coli* and *Salmonella typhosa*, respectively. The chemicals 2,3,5-trichloro-4-isopropoxy-6-(trifluoromethyl)pyridine, 2,3,5 - trichloro-6-(trifluoromethyl)-4-pyridinol and 6-(trifluoromethyl)-2-pyridinol, at a dosage rate of 400 parts per million, give at least 80 percent control of the Rice Blast organism.

The compounds 2,3,5-trichloro-4-methoxy-6-(trifluoromethyl)pyridine and ((3,5-dichloro-6-(trifluoromethyl)-2-pyridyl)oxy)acetic acid at a concentration of 3 parts per million in soil infested with root knot nematodes, are each found to give complete control of said nematodes.

The usefulness of the compounds hereof as anthelmintics can be seen from operations wherein each of the compounds 2,3,5-trichloro-6-(trifluoromethyl)-4-pyridinol, 3,5 - dichloro-4-((p-chlorophenyl)sulfonyl)-2-(trifluoromethyl)pyridine, 2,3,5 - trichloro-4-methoxy-6-(trifluoromethyl)pyridine, 2,3,5 - trichloro-6-(trifluoromethyl)-4-pyridinol, 3,5 - dichloro-6-(trifluoromethyl)-2-pyridinol, ((3,5 - dichloro-6-(trifluoromethyl)-2-pyridyl)oxy)acetic acid or 3,5-dichloro-4-(dipropylamino)-2-(trifluoromethyl)pyridine is incorporated at a concentration of 0.06 percent by weight in the diet ration of mice host animals variously infected with mouse pinworms, mouse trichostronglids, mouse tapeworms or pig acarids. It is found that each compound gives from 90 to 100 percent control of one or more of these parasitic organisms.

The halo-(trifluoromethyl)pyridine compounds employed as starting materials in forming the compounds of this invention can be prepared by intimately contacting the corresponding halo-(trichloromethyl)pyridine compounds with antimony trifluorodichloride to convert the CCl$_3$ group to a CF$_3$ group. In turn, suitable halo-(trichloromethyl)pyridine compounds for use in preparing the corresponding trifluoromethyl derivative compounds can be prepared by contacting an appropriate methylpyridine and hydrogen chloride at temperatures of about 50° C. to produce a liquid methylpyridine hydrochloride composition and thereafter passing chlorine gas through the liquid mixture at temperatures of about 95°–110° C. while irradiating the mixture. The resulting chloro-(trichloromethyl)pyridine products can then be distilled from the reaction product. In another preparation, halo-(trichloromethyl)pyridine compound can be prepared by rapidly mixing, in the vapor phase, chlorine, an appropriate methylpyridine compound and an inert diluent and subjecting the mixture to temperatures of about 400° to 490° C. for a brief contact time. The desired products can be then distilled from the resulting product stream.

Chloro-(trichloromethyl)pyridine compounds, as referred to above, can be converted to fluoro- or mixed fluoro-chloro-substituted (trifluoromethyl)pyridine compounds useful as starting compounds in the present invention by first reacting said chloro-(trichloromethyl)pyridine compounds with antimony trifluoro-dichloride, as discussed above, and then reacting the resulting chloro-(trifluoromethyl)pyridine compounds with potassium fluoride in a known manner to replace one or more of the chlorine atoms on the pyridine ring with fluorine atoms. Thus, 2,4-difluoro-6-(trifluoromethyl)pyridine can be prepared by heating 2,4-dichloro-6-(trifluoromethyl)-pyridine with an excess of potassium fluoride in a pressure vessel under autogenous pressures at 350° C. for 8 hours, the desired product being recovered by taking the reaction mixture up in a solvent, filtering to remove salts, and then distilling off the solvent. Similarly, 3,5-dichloro-2,4-difluoro-6-(trifluoromethyl)pyridine, along with 3-chloro-2,4,5-trifluoro-6-(trifluoromethyl)pyridine and 5-chloro-2,3,4-trifluoro-6-(trifluoromethyl)pyridine can be prepared by heating 2,3,4,5-trichloro-6-(trifluoromethyl)-pyridine with a large excess of potassium fluoride in a pressure vessel at 400° C. for 8 hours. After extracting the product with dichloromethane, filtering off the salts and stripping off the solvent, the residue is distilled under vacuum. The chloro-trifluoro-(trifluoromethyl)pyridine compounds, which make up about 40 percent of the product, are recovered as the fraction boiling at about 41° C. at 23 mm. Hg. The 3,5-dichloro-2,4-difluoro-6-(trifluoromethyl)pyridine is recovered in approximately 60 percent yield as the fraction boiling at 60° C. at 23 mm. Hg.

I claim:
1. A substituted (trifluoromethyl)pyridine compound having the formula

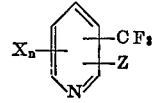

wherein X represents chlorine or fluorine, $n$ is an integer having a value of 0, 1, 2 or 3, and Z is a nitrile, derivative of an oxyloweralkanoic acid radical wherein "loweralkanoic acid" designates alkanoic acids of from 2 to 4 carbon atoms.

2. The compound of claim 1 which is 2-(6-trifluoromethyl)-2-pyridyloxy)acetonitrile.

References Cited
UNITED STATES PATENTS
2,868,794    1/1959    Cislak _____ 260—294.9

HARRY I. MOATZ, Primary Examiner

PO-1050
(5/69)

UNITED STATES PATENT OFFICE
CERTIFICATE OF CORRECTION

Patent No. 3,787,420        Dated January 22, 1974

Inventor(s) Florence E. Torba

It is certified that error appears in the above-identified patent and that said Letters Patent are hereby corrected as shown below:

Column 1, line 18, after "alkylthio," insert -- arylthio, --;

Column 1, lines 51-52, correct spelling of "arylthio";

Column 1, line 69, "an disobutyric" should read -- and isobutyric --;

Column 2, lines 4-5, delete second occurrence of "4-nitrophenyl";

Column 2, line 56, insert an opening parenthesis "(" before "trifluoro-";

Column 2, line 72, insert an opening parenthesis "(" before "trifluoromethyl";

Column 3, line 44, insert an opening parenthesis "(" before "trifluoromethyl";

Column 6, line 53, insert a closing parenthesis ")" after "(trifluoromethyl";

Column 7, line 32, correct spelling of "acid";

Column 7, line 70, correct spelling of "produce";

Column 8, line 1, correct spelling of "reaction";

Column 9, line 7, "99°" should read -- 90° --;

Column 9, line 34, "7.2" should read -- 7.3 --;

Column 12, line 39, correct spelling of "elemental";

UNITED STATES PATENT OFFICE
CERTIFICATE OF CORRECTION

Patent No. 3,787,420     Dated January 22, 1974

Inventor(s) Florence E. Torba     Page - 2

It is certified that error appears in the above-identified patent and that said Letters Patent are hereby corrected as shown below:

Column 12, line 73, delete minus "-" from before "18.27";

Column 17, line 11, change "These" to -- There --;

Column 17, line 31, insert an opening parenthesis "(" before "trifluoro-";

Column 19, line 32, correct spelling of "produce";

Column 19, line 50, "((3-di-" should read -- ((3,5-di- --;

Column 20, line 9, change "ureus" to read -- aureus --;

Signed and sealed this 29th day of October 1974.

(SEAL)
Attest:

McCOY M. GIBSON JR.
Attesting Officer

C. MARSHALL DANN
Commissioner of Patents